United States Patent
Marupaduga et al.

(10) Patent No.: US 10,171,282 B1
(45) Date of Patent: Jan. 1, 2019

(54) DYNAMIC OPTIMIZATION OF AMPLITUDE WEIGHTS

(71) Applicant: Sprint Communications Company L.P., Overland Park, KS (US)

(72) Inventors: Sreekar Marupaduga, Overland Park, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/808,652

(22) Filed: Nov. 9, 2017

(51) Int. Cl.
   *H04L 27/38* (2006.01)
   *H04B 17/29* (2015.01)
   *H04B 17/318* (2015.01)

(52) U.S. Cl.
   CPC .............. *H04L 27/38* (2013.01); *H04B 17/29* (2015.01); *H04B 17/318* (2015.01)

(58) Field of Classification Search
   CPC ........ H04L 27/38; H04B 17/29; H04B 17/318
   See application file for complete search history.

(56) References Cited

U.S. PATENT DOCUMENTS

| | | | | |
|---|---|---|---|---|
| 4,415,852 A | * | 11/1983 | Ashley | G01R 27/04 324/605 |
| 4,558,354 A | * | 12/1985 | Tanaka | H04N 5/208 348/626 |
| 5,867,054 A | * | 2/1999 | Kotowski | G01R 19/25 327/262 |
| 7,304,469 B1 | * | 12/2007 | Bradley | G01R 27/28 324/615 |

* cited by examiner

*Primary Examiner* — Jaison Joseph (57) ABSTRACT

Dynamic amplitude modulation in a telecommunications network in response to user reported performance indicators is described. The performance indicators may be associated with at least one user device and/or at least one antenna. For example, the performance indicators may include reference signal received power (RSRP), antenna gain, and/or insertion loss (IL). The performance indicators may trigger generation of new amplitude weights or values and application of the new amplitude weights or values to the telecommunications network.

20 Claims, 6 Drawing Sheets

DYNAMIC OPTIMIZATION OF AMPLITUDE WEIGHTS

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Telecommunications networks optimize signals to maximize the coverage and performance of an antenna array. One way in which telecommunications networks may be optimized is through beamforming. Generally, beamforming uses multiple antenna elements to control the direction of a wavefront by appropriately weighting the amplitude and phase of individual element signals. However, the elements of an antenna array and the cabling connecting the individual elements to the radio, phase shifter, electronic management system, and/or other network infrastructure are metallic.

Metal at a given temperature and size has a predictable effect on the amplitude of a signal transmitted through the metal. As the temperature of the metal varies the effect on the signal varies. This is especially true where temperature changes are localized, variable, and/or irregular. A practical result of this principle is that even small temperature differentials between the cabling and/or element(s) in one portion of an antenna array and the cabling and/or element(s) in a different portion of the antenna array can degrade the performance of beamformed signals.

Current telecommunications networks are incapable of detecting and reacting to these performance issues. Rather, most network providers simply assume that the antenna will experience a constant temperature and/or evenly distributed temperature and set the amplitude for each antenna element or a set of antenna elements and never alter it. The present disclosure is directed, in part, to the detection of network performance issues created by temperature differences and other factors and dynamically setting amplitude weights for antennas serving the communications network, substantially as shown in and/or described in connection with at least one of the figures, and is set forth more completely in the claims.

BRIEF DESCRIPTION OF THE DRAWINGS

Illustrative embodiments of the present invention are described in detail below with reference to the attached drawing figures, and wherein.

DETAILED DESCRIPTION

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Telecommunications networks optimize signals to maximize the coverage and performance of an antenna array. One way in which telecommunications networks may be optimized is through beamforming. Generally, beamforming uses multiple antenna elements to control the direction of a wavefront by appropriately weighting the amplitude and phase of individual element signals. However, the elements of an antenna array and the cabling connecting the individual elements to the radio, phase shifter, electronic management system, and/or other network infrastructure are metallic, which can cause difficulties in controlling amplitude values.

Metal at a given temperature and size has a predictable effect on the amplitude of a signal transmitted through the metal. As the temperature of the metal varies the effect on the signal varies. This is especially true where temperature changes are localized, variable, and/or irregular. A practical result of this principle is that even small temperature differentials between the cabling and/or element(s) in one portion of an antenna array and the cabling and/or element(s) in a different portion of the antenna array can degrade the performance of beamformed signals.

As such, a first aspect is directed to a method for dynamic optimization of amplitude weights. The method may begin by receiving user data, comprising at least reference signal received power (RSRP) values and identifying antenna gain data. Based on the RSRP data and the antenna gain data insertion loss (IL) data may be generated. The insertion loss data is compared to a predetermined threshold. If the insertion loss is above the threshold, the current settings, including the current amplitude values, for the radio are captured. Based on the current radio settings, a new set of amplitude weight values are generated. Once generated, the new amplitude weights are applied.

A second aspect is directed to a system with at least one processor and computer readable instructions for receiving both RSRP data from a set of user devices and antenna gain data from a radio and/or base station. The system generates IL data based on the RSRP data and gain data. The system compares the IL data to a predetermined threshold, and in response to the IL data being above the predetermined threshold, the current settings of the radio are received, including the current amplitude weights; and, based on the current settings, a new set of amplitude weights are generated and applied to the radio.

A third aspect is directed to computer readable media storing computer-useable instructions that cause a computing device to receive a set of RSRP data associated with communication from a radio to a set of user devices and receive a set of antenna gain data. Based on the RSRP and antenna gain data, a set of IL data is determined and compared to a predetermined threshold. When the IL data is above the predetermined threshold, a current set of radio settings is received, a new set of amplitude values are generated, and the new amplitude values are applied.

Figure 1:
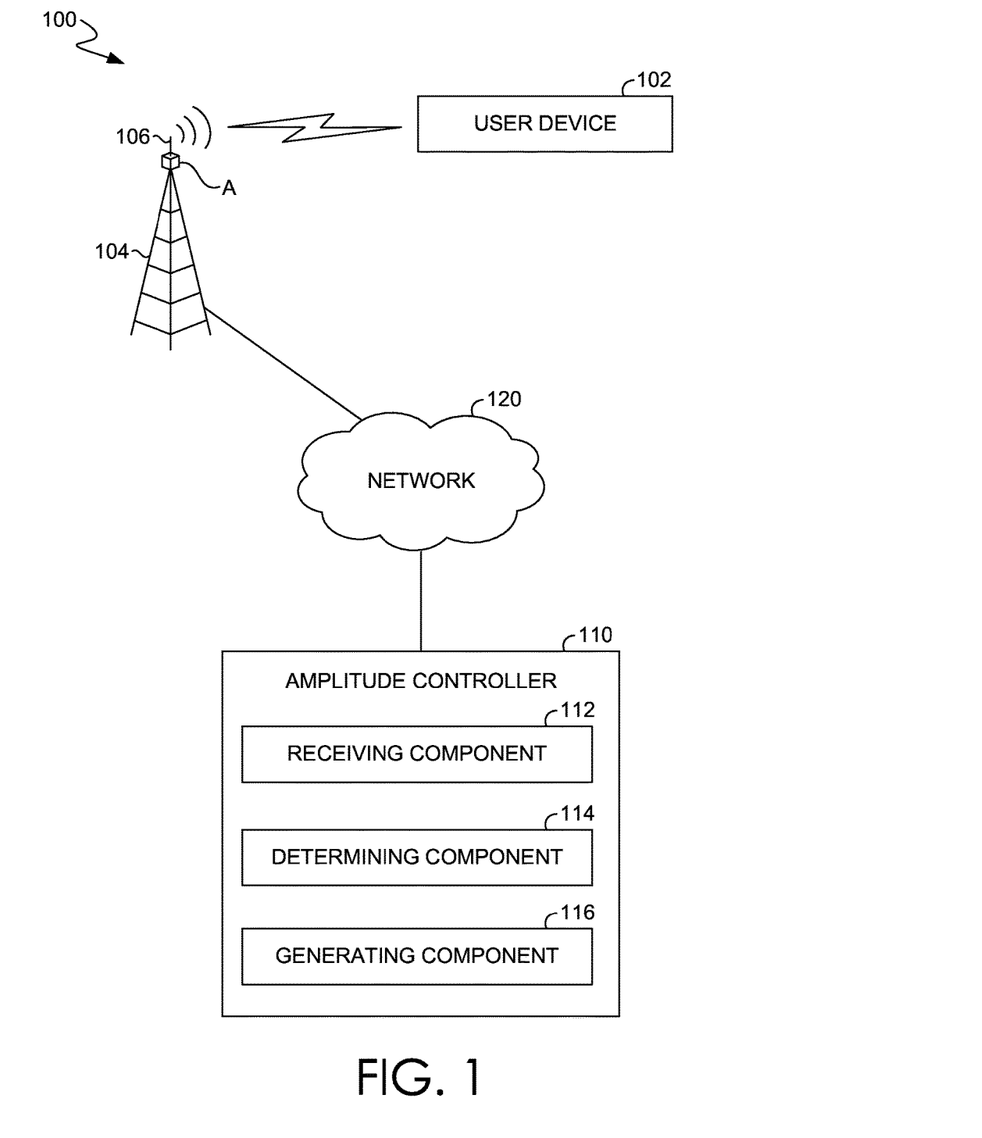
FIG. 1 depicts an exemplary environment suitable for use in implementing aspects herein.

Referring to FIG. 1, a network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

As previously mentioned, embodiments of the present invention are directed to dynamically adjusting amplitude weights within a network cell. In embodiments, a network cell may comprise a base station to facilitate wireless communication between communication devices within the network cell and a network. As shown in FIG. 1, a communication device may be one or more user devices 102. As used herein, user device and user equipment (UE) are used interchangeably and with the same meaning. In the network environment 100, user device 102 may communicate with other devices, such as mobile devices, servers, etc. The user device 102 may take on a variety of forms, such as a personal computer, a laptop computer, a tablet, a netbook, a mobile phone, a smart phone, a personal digital assistant, or any other device capable of communicating with other devices by way of a network. In one embodiment, user device 102 is a type of device described herein with respect to FIG. 1. Makers of illustrated user devices include, for example, Research in Motion, Creative Technologies Corp., Samsung, Apple computers, Nokia, Motorola, and the like. A user device 102 may comprise, for example, a display(s), a power source(s) (e.g., a battery), a data store(s), a speaker (s), memory, a buffer(s), and the like. In embodiments, user device 102 comprises a wireless or mobile device with which a wireless telecommunications network(s) can be utilized for communication (e.g., voice and/or data communication). In this regard, the user device 102 can be any mobile computing device that communicates by way of, for example, a 3G or 4G network. In embodiments, network environment 100 may further comprise a plurality of user devices substantially similar to user device 102.

The user device 102 may utilize network 120 to communicate with other computing devices, such as another user device. In embodiments, network 120 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 120 may include multiple networks, as well as being a network of networks, but is shown in more simple form so as to not obscure other aspects of the present disclosure. Network 120 may be part of a telecommunications network that connects subscribers to their immediate service provider. In embodiments, network 120 is associated with a telecommunications provider that provides services to user devices, such as user device 102. For example, network 120 may provide voice services to user devices or corresponding users that are registered or subscribed to utilize the services provided by a telecommunications provider. Network 120 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), a 5G network, or the like.

The network environment 100 may also include a database (not shown). The database can be any type of medium that is capable of storing information. The database can be any collection of records. As a non-limiting example, the database may be a collection of RSRP values and associated location information, one or more reference tables, one or more historic models, and/or one or more predictive models. In one embodiment, the database includes a set of embodied computer-executable instructions that, when executed, facilitate various aspects disclosed herein. These embodied instructions will variously be referred to as "instructions" or an "application" for short. In some embodiments, the database(s) may be communicatively connected with amplitude controller 110 through network 120. In some embodiments, the database(s) may be a subcomponent of amplitude controller 110.

As previously mentioned, the user device 102 may communicate with other devices by using a base station, such as base station 104. In embodiments, base station 104 is a wireless communications station that is installed at a fixed location, such as a telecommunication tower, as illustrated in FIG. 1. The telecommunication tower may be a structure designed to support one or more antennas 106 for telecommunications and/or broadcasting. In other embodiments, base station 104 is a mobile base station (e.g., small cell). The base station 104 may be an eNode B in an LTE telecommunications network and may be used to communicate as part of the wireless communications network. In this way, base station 104 can facilitate wireless communications between user device 102 and other devices, user devices, the Internet, and/or network 120.

The base station 104 may include at least one baseband unit (BBU) responsible for, among other things, digital baseband signal processing. For instance, CDMA/EVDO and LTE Internet protocol (IP) packets are received from a wireless communications network and are digitally combined by the BBU at the base station 104. The blended digital baseband signal is transmitted to a radio at the base station 104. Digital baseband signals received from the radio are demodulated by the BBU and the resulting IP packets are transmitted by the BBU to the network. In some embodiments, the base station 104 also includes or is associated with an LTE System Manager (LSM) configured to manage a master list (e.g., a table) of amplitude weights. The list of amplitude weights may include a plurality of amplitude weights applicable to a plurality of antennas, antenna model numbers, radios, tilt angles of antennas, and the like. The listing may also include amplitude weights applicable to various broadcast configurations, such as full-power broadcast with and/or without beamforming, non-full power broadcast with and/or without beamforming, and/or tapered beamforming.

As stated, the base station 104 may include a radio (not shown) or a remote radio head (RRH) that generally communicates with one or more antennas 106 associated with the base station 104. In some embodiments, the one or more antennas comprise at least one antenna and/or antenna array. In this regard, the radio is used to transmit signals and/or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like. Each physical path may be connected to an element or set of elements in the antenna 106.

The radio associated with the base station 104 may include at least one transceiver configured to receive and transmit signals or data. For example, the radio may transmit and receive wireless RF signals and convert the blended digital signal received from the BBU into an analog RF output via a digital-to-analog (AD) converter. The analog signal may be amplified by an amplifier in the radio and sent out for transmission by antenna 106 to a remote communications device, such as user device 102. The RF signals received from the remote communications device, such as user device 102, by antenna 106 are amplified by the radio and converted to digital baseband signals for transmission to the BBU.

The antenna 106 may be used for telecommunications. Generally, the antenna 106 may be an electrical device that converts electric power into radio waves and converts radio waves into electric power. The antenna 106 is typically positioned at or near the top of the telecommunication tower as illustrated in FIG. 1. Such an installation location, however, is not intended to limit the scope of embodiments of the present invention. In some embodiments, antenna 106 is a single antenna, at least one antenna, and/or a plurality of antennas. In some embodiments, antenna 106 comprises one or more elements.

Further, the antenna 106 may be configured to support multiple-input-multiple-output (MIMO) and beamforming transmission modes. In embodiments, antenna 106 relies on a MIMO transmission mode when user device 102 is located near the radio tower and relies on a beamforming transmission mode when the user device 102 is located on the periphery of a coverage area.

Continuing, the network environment 100 may further include an amplitude controller 110. The amplitude controller 110 may be configured to, among other things, control the weights of the amplitude in accordance with the present disclosure. The amplitude controller 110 may comprise a server, one or more processors, and one or more databases. Though amplitude controller 110 is illustrated separately in FIG. 1, it may be a component of base station 104, antenna 106, remotely located as a standalone system, and/or a subcomponent of a system connected to network 120.

As mentioned, the amplitude controller 110 may control weights for the amplitude at one or more antennas associated with one or more base stations, such as base station 104. The amplitude controller 110 may include, among other things, a receiving component 112, a determining component 114, and generating component 116. The receiving component 112 may receive, among other things, data from user devices, such as user device 102, within a network cell associated with a particular base station, such as base station 104. The determining component 114 may evaluate the data received by the receiving component 112 and, based on the evaluation, activate generating component 116. In some embodiments, the generating component 116 detects or identifies the current set of amplitude weights associated with the base station 104 and/or antenna 106. Generating component 116 may generate a new set of amplitude weights. Once generated, the new set of amplitude weights may be applied to base station 104 and/or antenna 106 by the amplitude controller 110.

Receiving component 112 receives information from base station 104. In some embodiments, receiving component 112 receives the information from the base station 104 through the network 120. The data received by the receiving component 112 may be stored, at least temporarily, as a part of historical data received from the user device 102. The historical data may indicate various information about the user device 102 and network performance. For instance, the historical data may include: user device identifiers, such as device model numbers, serial numbers, ICCID, FCC ID, firmware version information, and/or the like; RSRP values; time and user device location information associated with the RSRP values; antenna gain at the time of RSRP receipt; antenna, antenna array, radio, and/or base station settings; and manufacturer specification information. However, it will be understood that the preceding is not an exhaustive list and other relevant historical data may be included in the historical data. The historical data may be collected and stored over a period of time.

The receiving component 112 may receive data continuously and/or periodically, such as, for instance, every two to six hours, twice a day, once a day, or once a week. Longer time periods, such as two weeks to three months, and other periods of time are also contemplated in accordance with aspects disclosed herein. The data received during these periods may be used to provide information relating to a user device 102 at a specific point in time or may be used to develop historical patterns, such as patterns of user device locations and/or network performance within a network cell over time.

This data received by the receiving component 112 may include network performance indicator(s), environmental data, and/or location data indicating a location of the user device 102 within the cell. A performance indicator may indicate a subjective and/or objective measure of the connection quality for the user device 102 within the cell. For example, in some embodiments a performance indicator is reference signal received power (RSRP) data. Environmental data may indicate temperature, time, pressure, or brightness at and/or near the base station 104 and/or antenna 106. In some embodiments, environmental data is provided by a sensor and/or third party environmental data providers such as local and national weather forecasting and reporting organizations. Location data may indicate specific coordinates of the user device 102 and/or may indicate a distance between the user device 102 and the base station 104 and/or an indication of a direction.

Determining component 114 monitors and analyzes the performance indicators received by receiving component 112. Further, determining component 114 determines whether to dynamically modify the amplitude weights of one or more elements of an antenna, such as antenna 106. In some embodiments, determining component 114 monitors and analyzes performance indicators associated with user devices individually, such as RSRP. In some embodiments, determining component 114 monitors and analyzes parameters associated with a base station 104 and/or an antenna 106, such as antenna gain. In some embodiments, determining component 114 derives, monitors, and analyzes performance indicators related to user devices based on information captured from user devices and the base station 104 and/or antenna 106, such as insertion loss (IL).

In some embodiments, determining component 114 analyzes communication parameters by comparing the monitored data with one or more performance thresholds. Performance thresholds may be associated with an individual performance indicator parameter. For example, RSRP may have a first performance threshold and IL may have a second performance threshold. In some embodiments, the individual performance thresholds may be a predetermined value for each performance indicator. For example, in some embodiments an RSRP less than or equal to −85 dB, −90 dB, or −95 dB may be a predetermined value that may indicate dynamic optimization of amplitude is appropriate. In some embodiments, the experience threshold may be associated with multiple performance indicators. For example, an experience threshold may be an RSRP of a first value with an antenna gain of a second value. It will be understood by those skilled in the art that the proceeding performance thresholds are merely examples of possible multi-variant thresholds determining component 114 may use to analyze the performance indicators.

Further, determining component 114 may comprise a historical database of performance indicators (not shown) and/or may be communicatively coupled to a database (not shown) storing, at least temporarily, performance indicators. In some embodiments, the database receives performance indicators associated with a user device, two or more user devices, and/or a plurality of user devices. The performance indicators may also be associated with a plurality, two or more, and/or one antenna, antenna array, telecommunication tower, and/or base station. For example, the database may comprise a list of RSRP, antenna gain, IL, and/or location information of the user devices at the time the associated performance indicator(s) were received. The database may also comprise the amplitude weights and/or environmental data at the time the associated performance indicator(s) were received.

In some embodiments, determining component 114 compares one or more of the monitored performance indicators with the antenna gain to derive IL data. For example, the IL data may comprise a numerical value that represents the loss of signal power based on the antenna gain and the RSRP. Determining component 114 may determine whether the IL data violates a performance threshold. In such an embodiment, violations of the performance threshold by the performance indicator(s) may trigger the determining component 114 to activate generating component 116. In some embodiments, the performance threshold(s) is based, in part, on the historical database of performance indicators.

Generating component 116 generates beamforming weights and applies the beamforming weights to an antenna, such as antenna 106. In some embodiments, generating component 116 generates the amplitude weights upon activation by determining component 114. Further, generating component 116 may detect the current transmission mode and/or amplitude weights currently used by an antenna, such as antenna 106 and/or base station 104. In some embodiments, generation of the amplitude weights by generating component 116 comprises selection of a set of amplitude weights from a predetermined list of potential amplitude weights. In an embodiment, the list of potential amplitude weights is based on amplitude weights applied to a similar base station, antenna, and/or antenna array in a testing environment. Additionally, and/or alternatively, generation of the amplitude weights may comprise utilizing machine learning models for optimized amplitude weights based on theoretical and/or historical base station, antenna, and/or antenna array performance data. In some embodiments, the historical base station, antenna, and/or antenna array performance is determined by performance indicators analyzed by the amplitude controller and the associated amplitude weights used by the antenna, antenna array, and/or base station.

Figure 2:
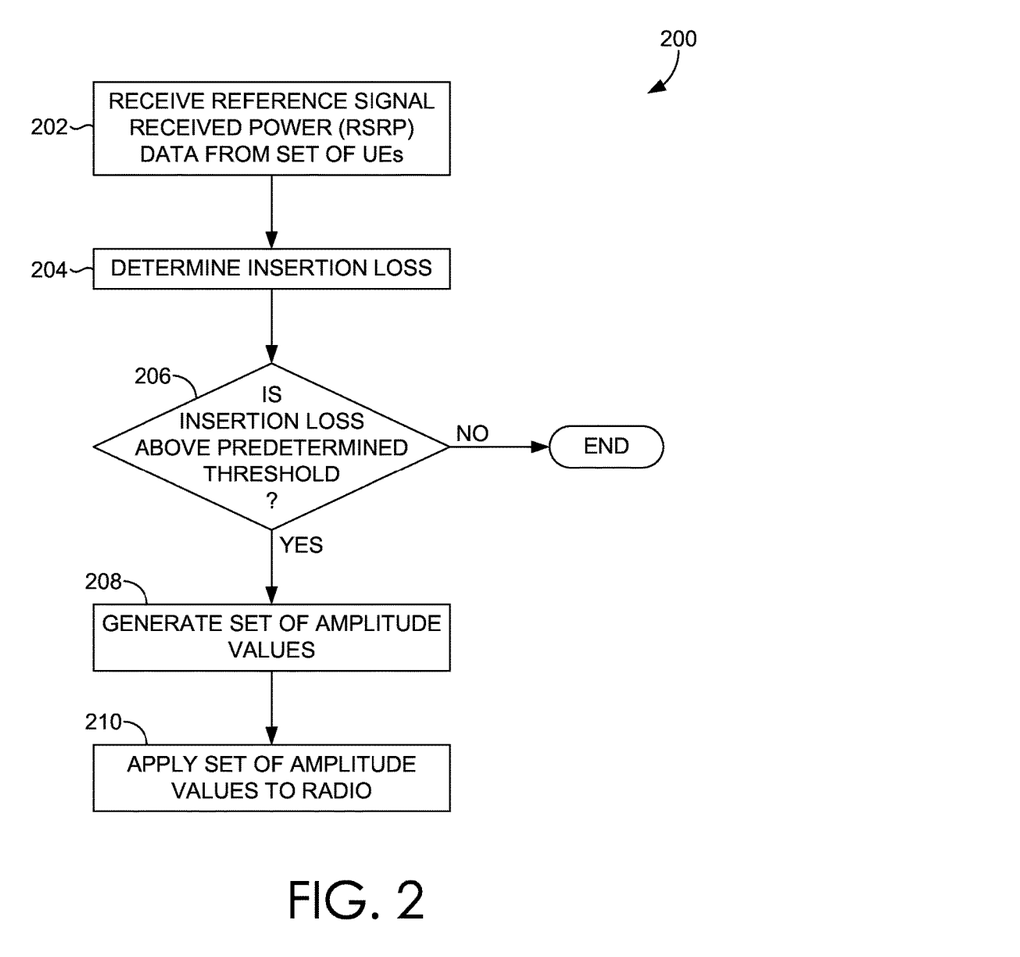
FIG. 2 depicts an exemplary method for dynamic amplitude modulation, according to an aspect herein.

Turning to FIG. 2, a flow chart illustrating method 200 for dynamically adjusting amplitude weights within a network cell in accordance with aspects disclosed herein is provided. In some embodiments, method 200 is used for dynamic amplitude modification in response to sub-optimal communication, as reflected by RSRP, IL, and/or other performance indicators, between a base station and at least one user device. Sub-optimal communication may be detected and dynamic amplitude modification activated by a specialized system, such as amplitude controller 110 described in relation to FIG. 1, which monitors performance indicators.

At block 202, RSRP data is received from a set of UEs. Some embodiments of block 202 receive other performance indicators from a set of UEs. For example, a performance indicator may be RSRP, channel quality indicator (CQI), and/or signal to noise ratio (SINR) as reported by at least one UE. Some embodiments of block 202 are facilitated by an amplitude controller, and/or an amplitude controller's subcomponents, such as amplitude controller 110 and/or receiving component 112. In some embodiments, location data associated with the at least one user device is also received. The performance indicator(s) and/or location data may be received continuously, periodically, and/or intermittently.

At block 204, insertion loss (IL) is determined. In some embodiments, IL is derived based at least in part on the information received from a user device. For instance, IL may be determined, in part, from a performance indicator, such as RSRP, SINR, and/or CQI. Additionally, in some embodiments, a performance indicator is derived from other information received from the user device and/or the base station, radio, and/or antenna. For example, some embodiments receive information from the base station 104 related to the current antenna gain associated with antenna 106. Some embodiments compare the RSRP data received in block 202 with the current antenna gain to derive the IL. Some embodiments rely on a lookup table that charts user device reported RSRP, antenna gain, and IL. Some embodiments of block 204 are facilitated by an amplitude controller, and/or an amplitude controller's subcomponents, such as amplitude controller 110 and/or determining component 114.

In general, the performance indicator is analyzed to determine whether the user device is indicting sub-optimal communication between the network and the user device. Thus, at block 206 IL is evaluated to determine if the performance indicator violates a predetermined threshold. Additionally and/or alternatively, other performance indicators, such as RSRP, SINR, and/or CQI, may be evaluated against a predetermined threshold. A violation of the predetermined threshold may vary depending on the performance indicator analyzed. In some instances, an IL greater than or equal to a predetermined value may be a violation. In others, an RSRP less than or equal to a predetermined value may be a violation. Further, the predetermined threshold may be partially based on the location of the user device, the specific performance indicators analyzed, and/or historic or hypothetical modeling. For instance, the predetermined threshold may vary given the proximity of the user device to the antenna. The determination step of block 206 may be facilitated by an amplitude controller and/or an amplitude controller's subcomponents, such as amplitude controller 110 and/or determining component 114. Additionally, in some embodiments, if the IL (and/or other performance indicator(s)) does not violate the predetermined threshold, the method 200 may return to block 202 (not shown) and receive new RSRP data from the user device(s). In an embodiment, if the predetermined threshold is not violated at block 206, the method 200 ends.

If it is determined at block 206 that the performance indicator violates the predetermined threshold, a set of amplitude weights is generated at block 208. Amplitude weights may be based on user device 102 data and current antenna, antenna array, and/or base station settings. In some embodiments, generating the amplitude weights further comprises comparing the current amplitude weights to a predetermined list of amplitude weights with known and/or predicted effects for the broadcasted signal. Additionally, and/or alternatively, generating the amplitude weights may further comprise comparing the current set of amplitude weights to sets of amplitude weights determined by machine learned models. For instance, a machine learned model may be based, at least in part on the historical data collected from user devices that connected and/or attempted to connect to the communication network through the antenna at issue. The generated set of amplitude weights comprises at least one different value from the current amplitude weights. As a non-limiting example, a set of amplitude weights may comprise a weight value for each column, row, and/or element of an antenna or antenna array. Based on the predetermined list and/or learned model, the amplitude weights may be increased or decreased. As such, the generated amplitude weights may comprise at least a different amplitude weight for one column, row, or element from the current amplitude settings.

The generation of block 208 may be facilitated by an amplitude controller and/or an amplitude controller's subcomponents, such as amplitude controller 110 and/or generating component 116. For example, if the determining component 114 determines that the insertion loss is above the predetermined threshold, the determining component may activate the generating component 116 to generate a set of amplitude weights.

At block 210, the set of generated amplitude weights is applied to the radio. Additionally, and/or alternatively, the set of generated amplitude weights may be applied to the base station, antenna, and/or antenna array. The application of block 210 may be facilitated by an amplitude controller, such as amplitude controller 110 as described herein with reference to FIG. 1. Generally, at block 210, generated amplitude weights are applied to an antenna, antenna array, base station, and/or radio such that the broadcasted signal is altered. In an example, applying the generated amplitude weights to the antenna may increase the RSRP reported by at least one user device 102. In other words, the application of the generated amplitude weights may alter the broadcast amplitude for at least one antenna element such that the wavefront created by the antenna is, at least partially, re-optimized.

Some embodiments of method 200 comprise additional and or alternative blocks. For example, block 210 may further comprise returning to block 202. As such, it will be understood by those skilled in the art that method 200 may be repeated periodically, intermittently, and/or continuously to facilitate multiple dynamic amplitude weight modifications. Further, method 200 may wait a predetermined period of time after block 210 and reapply the original set of amplitude weights and/or a default set of amplitude weights. The predetermined period of time may vary based on context. For example, a predetermined period of time may be based on the location of the base station 104 and/or antenna 106, the forecasted weather, predicted sun exposure, the time of year, the time of day, and/or other relevant environmental variables. As described herein with reference to FIG. 1, the environmental variables may be received from a sensor at or near the base station, antenna, antenna array, and/or radio. Additionally, and/or alternatively, the environmental variables may be received from third party environmental data providers such as local and national weather forecasting and reporting organizations.

Figure 3:
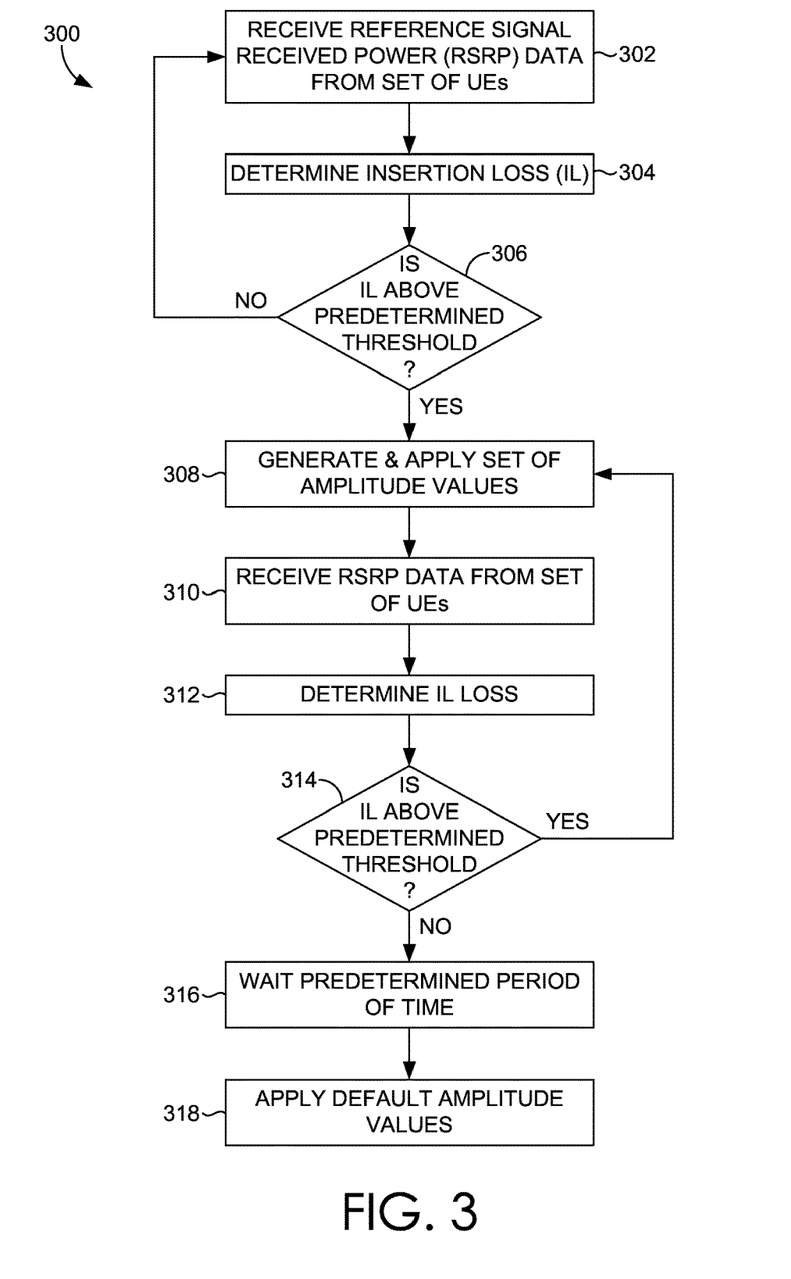
FIG. 3 depicts an exemplary flow diagram for dynamic amplitude modulation, according to an aspect herein.

Turning to FIG. 3, a flow 300 illustrating an embodiment of method 200 for dynamically adjusting amplitude weights within a network cell in accordance with aspects disclosed herein is provided. Generally, flow diagram 300 depicts a possible variant of method 200 that continuously, periodically, and/or intermittently monitors insertion loss (IL) derived from data received from a set of user devices, determines that the IL is above a predetermined threshold, generates and applies a set of amplitude values (weights), determines if the newly applied set of weights improved the IL data, and after a predetermined period of time returns the amplitude weights to a default value. Said another way, flow diagram 300 may be used as decision-support logic by amplitude controller 110 to detect sub-optimal network performance, take corrective action, monitor the impact of the corrective action and perform additional corrective actions as necessary, and return the network to the status quo ante sub-optimal network performance was detected. As such, some embodiments of flow diagram 300 begin with block 302. However, it will be understood by those skilled in the art that the flow diagram 300 may begin with other blocks not depicted herein. For example, some embodiments of method 300 begin with the broadcast of the reference signal by a base station, such as base station 104. The reference signal may be received by one or more user devices and in response may broadcast an RSRP signal back to the base station. It will also be understood by those skilled in the art that the flow diagram 300 may be incorporated as a subroutine and/or incorporate other subroutines depending on the needs of the specific implementation and environment.

At block 302, an RSRP data is received from a set of user devices. Generally, RSRP data may be received directly or indirectly. For example, in some embodiments of block 302, the RSRP data is received by amplitude controller 110 through a telecommunications network, such as network 120, from one or more user devices 102. The RSRP data may comprise multiple values associated with a specific antenna. For instance, where an antenna includes multiple elements, columns of elements, and/or rows of elements, RSRP data may comprise an RSRP value for each element, each column, and/or each row. Thus, for example, where an antenna is configured in a four by four, two polar, element arrangement, the RSRP data may comprise 32 RSRP values for each of the elements, 16 RSRP values for each bi-polar element set, 4 RSRP values for each bi-polar element row, and/or 4 RSRP values for each bi-polar element column. Additionally, and/or alternatively, the RSRP data may comprise a composite RSRP value which may represent the RSRP for the antenna and its constituent elements, columns of elements, and/or rows of elements. Further, in some embodiments of block 302, location data associated with each user device may be received. Location data may be any data that indicates the location of the user device. Further, user device 102 may report its current location. Some embodiments further comprise receiving antenna gain data. The antenna gain data may comprise multiple values associated with a specific antenna. For instance, where an antenna includes multiple elements, columns of elements, and/or rows of elements, antenna gain data may comprise an antenna gain value for each element, each column, and/or each row.

As a non-limiting example, block 302 may receive RSRP data comprising four RSRP values, one value for each of the four bi-polar element columns of an antenna, such as antenna 106. For example, user device 102 may report the four RSRP values as −65 dBm, −65.5 dBm, −72 dBm, and −96 dBm. Further, base station 104 may report the four antenna gain values as 18 dBi, 18.5 dBi, 17.5 dBi, and 19 dBi.

At block 304, insertion loss (IL) data is determined. In general, IL data may be determined based on at least RSRP data, as reported by one or more user devices, and antenna/array gain. In some embodiments of block 304 the comparison may rely on a lookup table that includes user device reported RSRP values, antenna gain values, and IL values. IL data may comprise multiple IL values associated with a specific antenna 106. For example, as discussed in relation to block 302, where an antenna includes multiple elements, multiple RSRP values may be received. Further, each of the elements, rows of elements, and/or column of elements may have an antenna/array gain value. Thus, IL data may comprise an IL value derived from each of the received RSRP values and corresponding antenna/array gain values. For example, block 304 may determine the IL data for the previously discussed illustrative four column antenna is 0.5 dB, 1 dB, 1.5 dB, and 3 dB. It will be understood by those skilled in the art that these values are meant as merely an illustrative example.

Some embodiments of block 304 are facilitated by an amplitude controller, and/or an amplitude controller's subcomponents, such as amplitude controller 110 and/or determining component 114. For example, some embodiments of block 304 receive information from the base station 104 related to the current antenna gain associated with antenna 106. Some embodiments of block 304 compare the RSRP data received in block 302 with the current antenna gain to derive the IL.

At block 306, it is determined if the IL is above a predetermined threshold. In some embodiments, the IL determined in block 304 is compared to the predetermined threshold. The predetermined threshold may be a value determined by a telecommunications provider based on desired network performance. For example, one provider may determine that an IL>1 dB represents unacceptable network performance, a second provider may determine that an IL≥0.75 dB represents unacceptable network performance, and a third provider may determine that an IL>3 dB represents unacceptable network performance. Further, the predetermined threshold may be based on the antenna model, manufacturer, and/or location. It will be understood by those skilled in the art that these are merely illustrative examples, and not intended to limit the scope of the embodiments described herein. Further, it will be understood by those skilled in the art that the predetermined threshold may be established for any desired dB value.

If the IL is not above the predetermined threshold, block 306 may return to block 302 and receive new RSRP data from the user device(s). Such an embodiment may allow for automatic continuous, periodic, and/or intermittent analysis of network performance despite an initial determination that performance is adequate. For example, for the illustrative four column antenna with IL values of 0.5 dB, 1 dB, 1.5 dB, and 3 dB: the first provider with an IL threshold>1 dB would proceed to block 308; the second provider with an IL threshold≥0.75 dB would also proceed to block 308; but, the third provider with an IL threshold>3 dB would return to block 302.

If the IL is determined to be above the predetermined threshold, the flow continues to block 308. At block 308, a set of amplitude values is generated and applied to the base station, antenna, and/or element(s). As discussed in relation to block 208 and 210, amplitude weights may be based on the IL data and the current antenna, antenna array, radio and/or base station settings. In some embodiments, generating the amplitude weights further comprises comparing the current amplitude weights to a predetermined list of antenna weights with known and/or predicted effects for the broadcasted signal. For example, if the current amplitude weights for the illustrative four column antenna are 0.25, 0.9, 0.9, and 0.3, a comparison to the predetermined list may indicate that increasing the amplitude weight of the first column to 0.42 while leaving the remaining columns unchanged is appropriate. However, it will be understood that the preceding is merely exemplary in nature and used for illustrative purposes.

Additionally, and/or alternatively, generating the amplitude weights may further comprise comparing the current antenna settings to the amplitude weights determined by machine learned models. In some embodiments, the generated amplitude weights comprise at least one value different from the current antenna settings. For example, the generated amplitude weights may comprise a different amplitude for an element, bi-polar element set, row of elements, and/or column of elements while maintaining the current values for the remaining elements, bi-polar elements, rows of elements, and/or columns of elements. The generation and application may be facilitated by an amplitude controller, and/or an amplitude controller's subcomponents, such as amplitude controller 110 and/or generating component 116. For example, upon determining that at the predetermined threshold is violated (i.e., that the IL is above a predetermined threshold), a determining component, such as determining component 114, may activate a generating component, such as generating component 116.

At block 310, RSRP data corresponding to the newly generated amplitude weights is received from the set of user devices. Similar to block 302, the RSRP data may comprise multiple values associated with a specific antenna. For instance where an antenna includes multiple elements, columns of elements, and/or rows of elements, RSRP data may comprise an RSRP value for each element, each column, and/or each row. IL data is then determined again at block 312 based on the updated RSRP data. Similar to block 304, the determination of IL may rely on a lookup table that includes user device reported RSRP, antenna gain, and IL. IL data may comprise multiple values associated with a specific antenna 106. For example, as discussed in relation to block 302, where an antenna includes multiple elements, multiple RSRP values and multiple antenna gain values may be received. At block 314, it is determined if the IL is above the predetermined threshold.

Upon determining that the IL is above the predetermined threshold some embodiments of block 314 return to block 308. Such an embodiment may facilitate dynamic continuous, periodic, and/or intermittent modification of amplitude weights for an antenna where the first set of generated amplitude weights failed to adequately correct the suboptimal network connectivity indicated by user device reported data.

In response to block 314 determining that IL is not above the predetermined threshold, method 300 may proceed to block 316. At block 316, method 300 waits for a predetermined period of time. The predetermined period of time may be a fixed period or a variable period of time. The fixed period of time may be chosen from any duration of time, for instance 15 minutes, 30 minutes, 1 hour, 2 hours, 4 hours, 8 hours, and so on. It will be understood by those skilled in the art that these durations are meant as illustrative examples, and as such are not an exhaustive list of durations contemplated within the scope of the embodiments discussed herein. As such, any duration of time from fractions of a second to a plurality of hours is contemplated as within the scope of the embodiments discussed herein. Further, the duration may vary by the antenna. For instance, a first antenna may have a first duration, a second antenna may have a second duration, and so on.

Alternatively, the predetermined period of time may be variable. In some embodiments, a variable period of time is based on the time between the application of amplitude weights and a time of day. In other words, block 316 may wait until a predetermined time has elapsed before continuing with flow 300. For example, if block 314 determines that the IL is below a predetermined threshold at 8:15 am, the flow 300 may wait until 12:00 pm (noon), before continuing. In some embodiments, a plurality of predetermined times exists. For instance, midnight, 8:00 am, 10:00 am, noon, 2:00 pm, 6:00 pm, and so on may all be considered predetermined times. It will be understood by those skilled in the art that these times are meant as illustrative examples, and as such are not an exhaustive list of times contemplated within the scope of the embodiments discussed herein. Further, the predetermined time may vary by the antenna. For instance, a first antenna may have a first predetermined time and/or set of times, a second antenna may have a second predetermined time and/or set of times, and so on. Further, in some embodiments the predetermined period of time is variable based on environmental data. For example, the predetermined period of time may be based on the forecasted temperature at the antenna, actual temperature of the antenna reported by a sensor, forecasted time of sunrise, and/or the forecasted time of sunset.

After expiration of the predetermined period of time, default amplitude values are applied at block 318. The default amplitude values may be a set of predetermined amplitude weights. Further, the default amplitude weights may be the amplitude weights that were used when flow 300 began. The default amplitude weights may also be determined based on a predetermined coverage area for the antenna, antenna model, and/or antenna manufacturer.

Flow 300 generally depicts one contemplated method of the embodiments discussed herein. As such, some embodiments of flow 300 include returning to block 302 from block 316 or returning to block 308 to reevaluate the generated amplitude weights.

Figure 4:
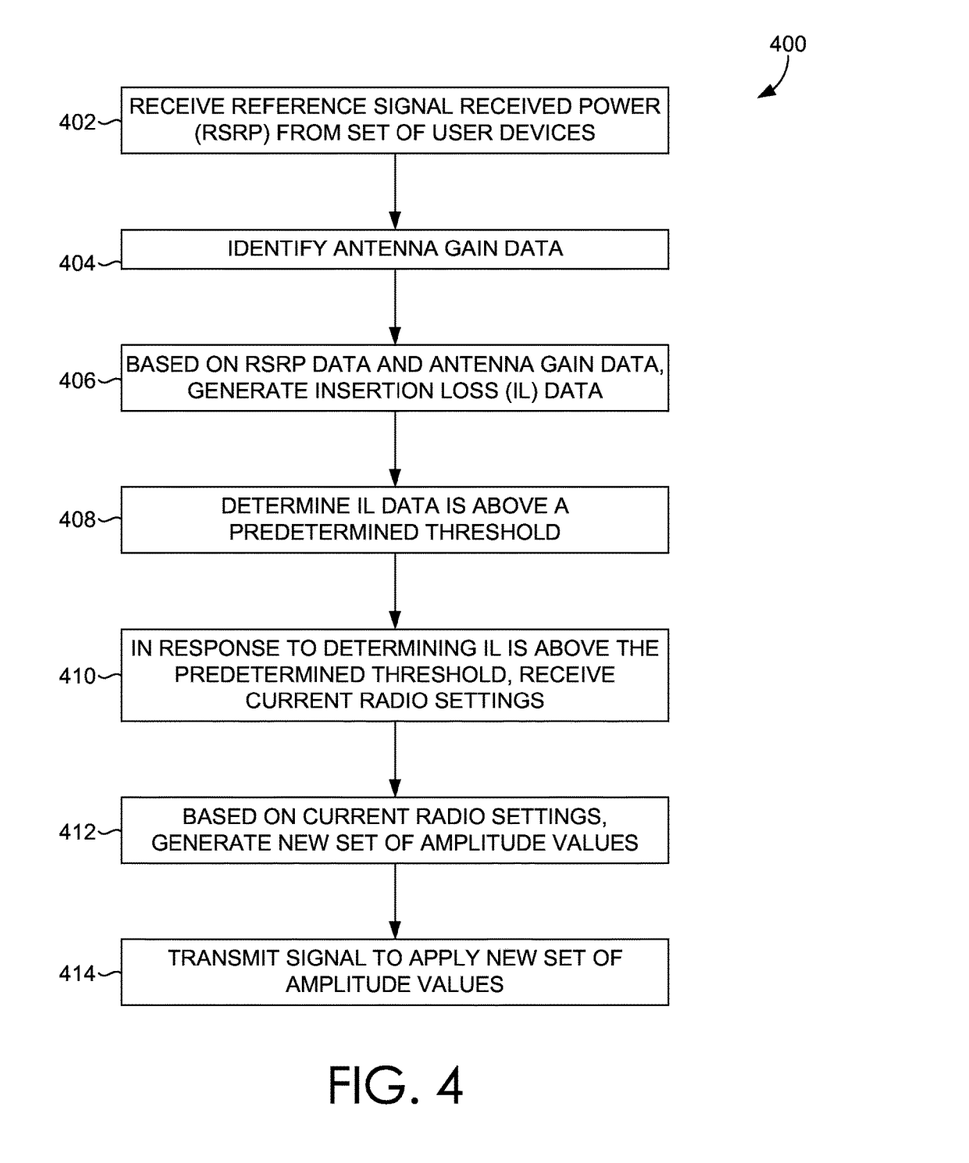
FIG. 4 depicts another exemplary method for dynamic amplitude modulation, according to an aspect herein.

With reference to FIG. 4, an exemplary method 400 for dynamic optimization of amplitude weights is depicted. An embodiment of method 400 begins with receiving reference signal received power (RSRP) from a set of user devices at block 402. At block 404, antenna gain data is identified. Based on the RSRP data and the antenna gain data, insertion loss (IL) data is generated at block 406. At block 408, it is determined that the IL data is above a predetermined threshold. In response to determining that the IL data is above the predetermined threshold, the current radio settings are received at block 410. Based on the current radio settings, a new set of amplitude values is generated at block 412. At block 414, a signal is transmitted to apply the new set of amplitude values.

Figure 5:
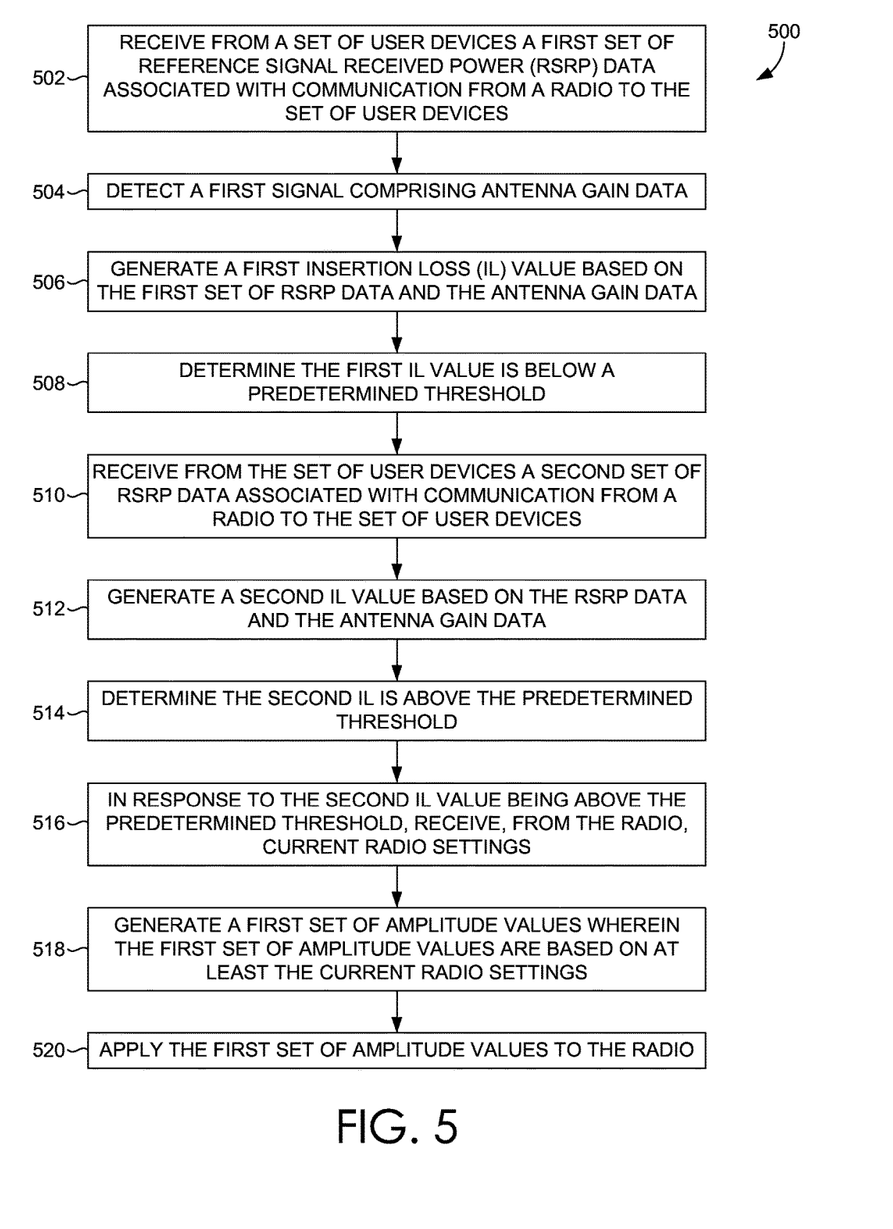
FIG. 5 depicts yet another exemplary method for dynamic amplitude modulation, according to an aspect herein; and, FIG. 6 depicts an exemplary computing device suitable for use in implementing aspects herein.

With reference to FIG. 5, an exemplary method 500 for dynamic optimization of amplitude values is depicted. An embodiment of method 500 begins with receiving, from a set of user devices, a first set of reference signal received power (RSRP) data associated with communication from a radio to the set of user devices at block 502. At block 504, a first signal comprising antenna gain data is detected. At block 506, a first insertion loss (IL) value is generated based on the first set of RSRP data and the antenna gain data. At block 508, the first IL value is determined to be below a predetermined threshold. At block 510, a second set of RSRP data associated with communication from a radio to the set of user devices is received from the set of user devices. At block 512, a second IL value is generated based on the RSRP data and the antenna gain data. At block 514, the second insertion loss value is determined to be above the predetermined threshold. In response to the second insertion loss value being above the predetermined threshold, current radio settings are received from the radio at block 516. At block 518, a first set of amplitude values is generated, wherein the first set of amplitude values are based on at least the current radio settings. At block 520, the first set of amplitude values are applied to the radio.

Figure 6:
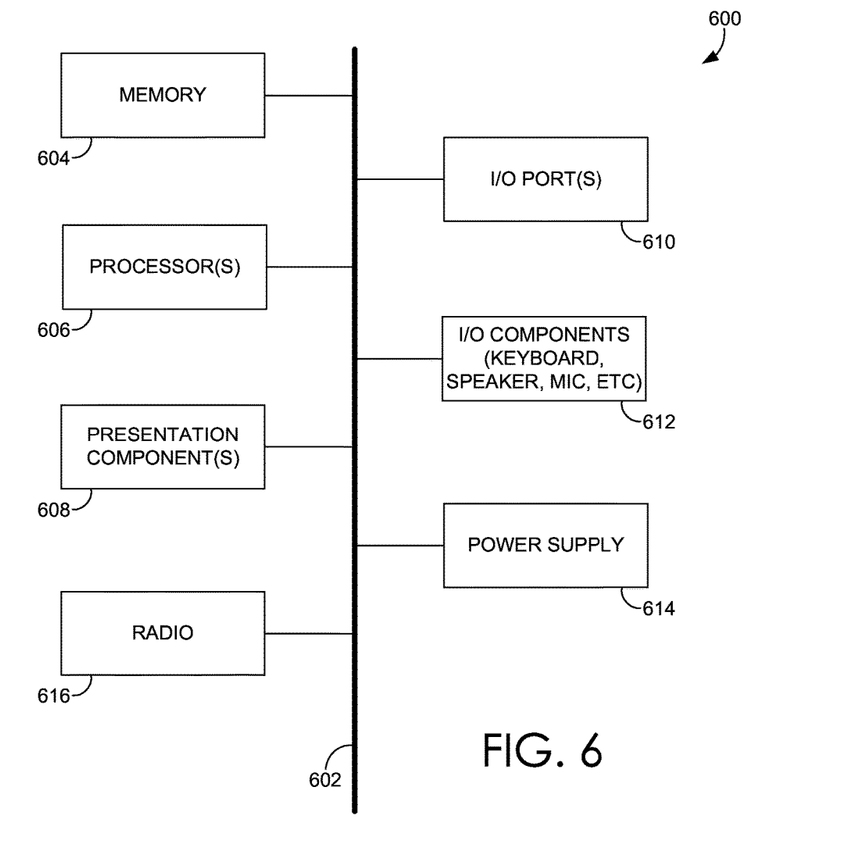

With reference to FIG. 6, computing device 600 includes a bus 602 that directly or indirectly couples the following devices: memory 604, one or more processors 606, one or more presentation components 608, input/output (I/O) ports 610, input/output (I/O) components 612, an illustrative power supply 614, and a radio 616. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 604 or I/O components 612. Presentation component(s) 608 present data indications to a user or other device. Exemplary presentation components include a display device, speaker, printing component, vibrating component, etc.

I/O ports 610 allow computing device 600 to be logically coupled to other devices including I/O components 612, some of which may be built in. Illustrative components include a microphone, joystick, game pad, satellite dish, scanner, printer, wireless device, etc.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamic optimization of amplitude weights, the method comprising:
receiving user data from a set of user devices, wherein the user data comprises reference signal received power (RSRP) data;
identifying antenna gain data;
based on the RSRP data and the antenna gain data, generating insertion loss data;
determining the insertion loss data is above a predetermined threshold;
in response to determining that the insertion loss data is above the predetermined threshold,
receiving current radio settings, wherein the current radio settings comprise a set of current amplitude values,
based on the current radio settings, generating a new set of amplitude values,
transmitting a signal to apply the new set of amplitude values.

2. The method of claim 1, further comprising:
receiving current radio temperature data, and
wherein generating the new set of amplitude values is further based on the current radio temperature data.

3. The method of claim 1, wherein the predetermined threshold is at least partially based on historical insertion loss data.

4. The method of claim 1, wherein the user data further comprises location data associated with each user device of the set of user devices; and
wherein the predetermined threshold is at least partially based on the location data.

5. The method of claim 1, wherein the new set of amplitude values comprises at least one increased amplitude value as compared to the corresponding amplitude value of the set of current amplitude values.

6. The method of claim 1, further comprising:
in response to a predetermined time elapsing, applying the set of current amplitude values.

7. A system for dynamic optimization of amplitude weights comprising:
at least one processor configured for:
receiving, by a controller from a set of user devices, reference signal received power (RSRP) data associated with communication from a radio to the set of user devices, wherein the set of user devices comprises at least one user device;
detecting from the radio, by the controller, a first signal comprising antenna gain data;
generating, by the controller, an insertion loss value based on the RSRP data and the antenna gain data;
determining, by the controller, the insertion loss value is above a predetermined threshold;
in response to determining that the insertion loss value is above the predetermined threshold,
receiving, by the controller, current radio settings, wherein the current radio settings comprise a set of current amplitude values,
generating, by the controller, a first set of amplitude values, wherein the first set of amplitude values are based on at least the current radio settings, and
applying, by the controller, the first set of amplitude values.

8. The system of claim 7, wherein generating the first set of amplitude values is further based on the insertion loss value.

9. The system of claim 7, wherein the at least one processor is further configured for:
receiving, by the controller, temperature data associated with the radio; and
wherein the first set of amplitude values is further based on the temperature data.

10. The system of claim 7, wherein the predetermined threshold is at least partially based on historical insertion loss data.

11. The system of claim 7, wherein the predetermined threshold is at least partially based on a location associated with each user device of the set of user devices.

12. The system of claim 7, wherein applying the first set of amplitude values is facilitated by an electronic management system or a phase shifter associated with at least the radio.

13. The system of claim 7, wherein the first set of amplitude values comprises at least one increased amplitude value as compared to the corresponding amplitude value of the set of current amplitude values.

14. The system of claim 7, wherein in response to a predetermined time elapsing, applying by the controller the set of current amplitude values.

15. One or more non-transitory computer readable media storing computer-useable instructions that, when used by one or more computing devices, cause the one or more computing devices to perform operations comprising:
by a controller:
receiving, from a set of user devices, a first set of reference signal received power (RSRP) data associated with communication from a radio to the set of user devices;
detecting a first signal comprising antenna gain data;
generating a first insertion loss value based on the first set of RSRP data and the antenna gain data;
determining the first insertion loss value is below a predetermined threshold;
receiving, from the set of user devices, a second set of RSRP data associated with communication from a radio to the set of user devices;
generating a second insertion loss value based on the RSRP data and the antenna gain data;

determining the second insertion loss value is above the predetermined threshold; and in response to the second insertion loss value being above the predetermined threshold, receiving, from the radio, current radio settings, generating a first set of amplitude values, wherein the first set of amplitude values are based on at least the current radio settings, and applying the first set of amplitude values to the radio.

16. The non-transitory computer readable media of claim 15, wherein the predetermined threshold is at least partially based on historical insertion loss data.

17. The non-transitory computer readable media of claim 15, wherein the first set of amplitude values comprises at least one increased amplitude value as compared to the corresponding amplitude value of the set of current amplitude values.

18. The non-transitory computer readable media of claim 15, wherein the predetermined threshold is at least partially based on a location associated with each user device of the set of user devices.

19. The non-transitory computer readable media of claim 15, wherein generating the first set of amplitude values is further based on the insertion loss value.

20. The non-transitory computer readable media of claim 15, further comprising:

receiving current radio temperature data, and wherein generating the new set of amplitude values is further based on the current radio temperature data.

* * * * *